United States Patent
Rozelle

(10) Patent No.: US 7,628,069 B2
(45) Date of Patent: Dec. 8, 2009

(54) CLOSED LOOP SCALE FACTOR ESTIMATION

(75) Inventor: David M. Rozelle, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 110 days.

(21) Appl. No.: 11/973,755

(22) Filed: Oct. 10, 2007

(65) Prior Publication Data

US 2009/0095078 A1    Apr. 16, 2009

(51) Int. Cl.
*G01P 9/04* (2006.01)
(52) U.S. Cl. .................................. 73/504.13; 73/1.37
(58) Field of Classification Search ............... 73/504.13, 73/504.12, 504.04, 504.15, 504.16, 1.37
See application file for complete search history.

(56) References Cited

U.S. PATENT DOCUMENTS

| | | | | |
|---|---|---|---|---|
| 3,902,374 A | * | 9/1975 | Hoffman et al. | 74/5.6 D |
| 5,218,867 A | * | 6/1993 | Varnham et al. | 73/504.13 |
| 5,712,427 A | * | 1/1998 | Matthews | 73/504.04 |
| 5,983,719 A | * | 11/1999 | Matthews et al. | 73/504.13 |
| 6,467,346 B1 | * | 10/2002 | Challoner et al. | 73/504.02 |

* cited by examiner

*Primary Examiner*—Helen C. Kwok
(74) *Attorney, Agent, or Firm*—Carmen Patti Law Group, LLC

(57) ABSTRACT

A closed loop scale factor estimator of an apparatus in one example is configured to compare a measured flex angle of a hemispherical resonator gyroscope (HRG) with a demodulation angle signal to estimate a force-to-rebalance (FTR) scale factor for the HRG, wherein the demodulation angle signal corresponds to an integral of a non-uniform rate signal applied to the HRG.

25 Claims, 5 Drawing Sheets

← 802

← 902

CLOSED LOOP SCALE FACTOR ESTIMATION

TECHNICAL FIELD

The invention relates generally to gyroscopes and more particularly to hemispherical resonator gyroscopes.

BACKGROUND

Known inertial reference units (IRU) may employ a Hemispherical Resonator Gyro (HRG) and use digital control loop algorithms which may operate in two distinct modes: Force to Rebalance (FTR) and Whole Angle (WA). The FTR mode provides high performance angular rate data by caging a resonant standing wave of the HRG by rebalancing it with electrical force. The WA mode, which allows the standing wave to rotate in an open loop fashion, provides extremely stable angle readout because its scaling depends only on its hemispherical geometry of the sensor for stability.

Force to Rebalance scaling is dependent on the stability of many different sources, such as forcer to resonator gaps, pickoff to resonator gaps, −100v resonator bias voltage, analog gain of pickoff readout, A/D voltage reference, pulse width modulated (PWM) forcer signal characteristics, and others. These effects degrade the FTR scale factor (SF) over time and with temperature. The scaling of the resonator flex pattern motion relative to the rotation of the gyro in inertial space, the geometric scale factor, is dependent only upon the geometry of the resonator and accordingly is very insensitive to thermal expansion effects, material property effects, etc. Previous testing has shown the geometric scale factor to be stable down to 0.02 ppm.

A closed loop scale factor (CLSF) error correction technique may be employed to measure and correct the HRG scale factor errors when using the force to rebalance mode of operation. The existing closed loop technique employs a deterministic 125 Hz rate square-wave modulation signal which is summed with the FTR loop command. In known closed loop calculations, it is assumed that the square-wave modulation signal is above the bandwidth of a rate control loop for the HRG, limiting the useable bandwidth of the gyro output. Also, the presence of inertial rate inputs that are correlated to the square-wave modulation signal may create large transients in the scale factor estimation, causing errors in the system output.

Thus, there is a need for reduced correlation of the input signal modulation with the inertial rate input.

SUMMARY

The invention in one implementation encompasses an apparatus. The apparatus comprises a closed loop scale factor (CLSF) estimator configured to compare a measured flex angle of a hemispherical resonator gyroscope (HRG) with a demodulation angle signal to estimate a force-to-rebalance (FTR) scale factor for the HRG, wherein the demodulation angle signal corresponds to an integral of a non-uniform rate signal applied to the HRG.

Another implementation of the invention encompasses a method for closed loop scale factor estimation. A non-uniform rate signal is provided to a closed loop scale factor (CLSF) estimator. The non-uniform rate signal is applied to a hemispherical resonator gyroscope (HRG). A force-to-rebalance (FTR) scale factor is estimated based on a comparison of a measured flex angle of the HRG with a demodulation angle signal. The demodulation angle signal corresponds to an integral of the non-uniform rate signal.

A further implementation of the invention encompasses an apparatus. The apparatus comprises a hemispherical resonator gyroscope (HRG), a rate control compensator, a signal source, and a gain controller. The rate control compensator is configured to estimate a force-to-rebalance (FTR) rate signal for the HRG. The signal source is configured to provide a non-uniform rate signal. The gain controller is configured to estimate a closed loop scale factor for the HRG based on a comparison of an integral of the non-uniform rate signal with a measured flex angle of the HRG.

DESCRIPTION OF THE DRAWINGS

Features of example implementations of the invention will become apparent from the description, the claims, and the accompanying drawings in which:

DETAILED DESCRIPTION

Prior art inertial reference unit (IRU) systems use the closed loop scale factor (CLSF) method to correct the scale factor of gyros by adding a square wave modulation on top of a force to rebalance (FTR) feedback signal. The frequency of the modulation is set above the bandwidth for the system, for example, a 125 Hz modulation for a system with a bandwidth of 5 Hz. The response of the gyro is read out from the in-phase node readout signal (ndcos) which is then used with the in-phase antinodal signal (ancos) to calculate the angle of flex pattern rotation using an arc-tangent (atan) calculation. Since the a tan calculation is a ratio of the ndcos over the ancos it is insensitive to the common gain errors (e.g., A/D voltage reference, −100 v resonator bias voltage, analog gain of pickoff readout, forcer to resonator gaps, and pickoff to resonator gaps). This a tan angle is compared to the expected angle (based on a priori SF knowledge). The ratio between the measured angle and the expected angle is then used as a correction factor for the SF in the conversion of the forcer feedback signal voltage to the measured rotation rate. A sync filter with a zero-gain notch at the 125 Hz modulation rate and its harmonics eliminates them from propagating through the signal path past the filter.

One requirement of the CLSF method is that the system output must have a signal bandwidth well below the 125 Hz modulation rate. While low rates may be adequate for satellite bus control, more agile payload control applications will require much higher bandwidths, possibly 200 Hz and higher.

The CLSF method also has a significant error ("CLSF glitch") induced in both scale factor and bias when the frequency of the gyro flex pattern aligns with a harmonic of the 125 Hz modulation rate. Additional interactions have been observed to occur between the 125 Hz modulations and harmonics of the other signals in some implementations. The CLSF also seems to be limited in accuracy to around 100 ppm for estimation of the SF correction factor.

Figure 1:
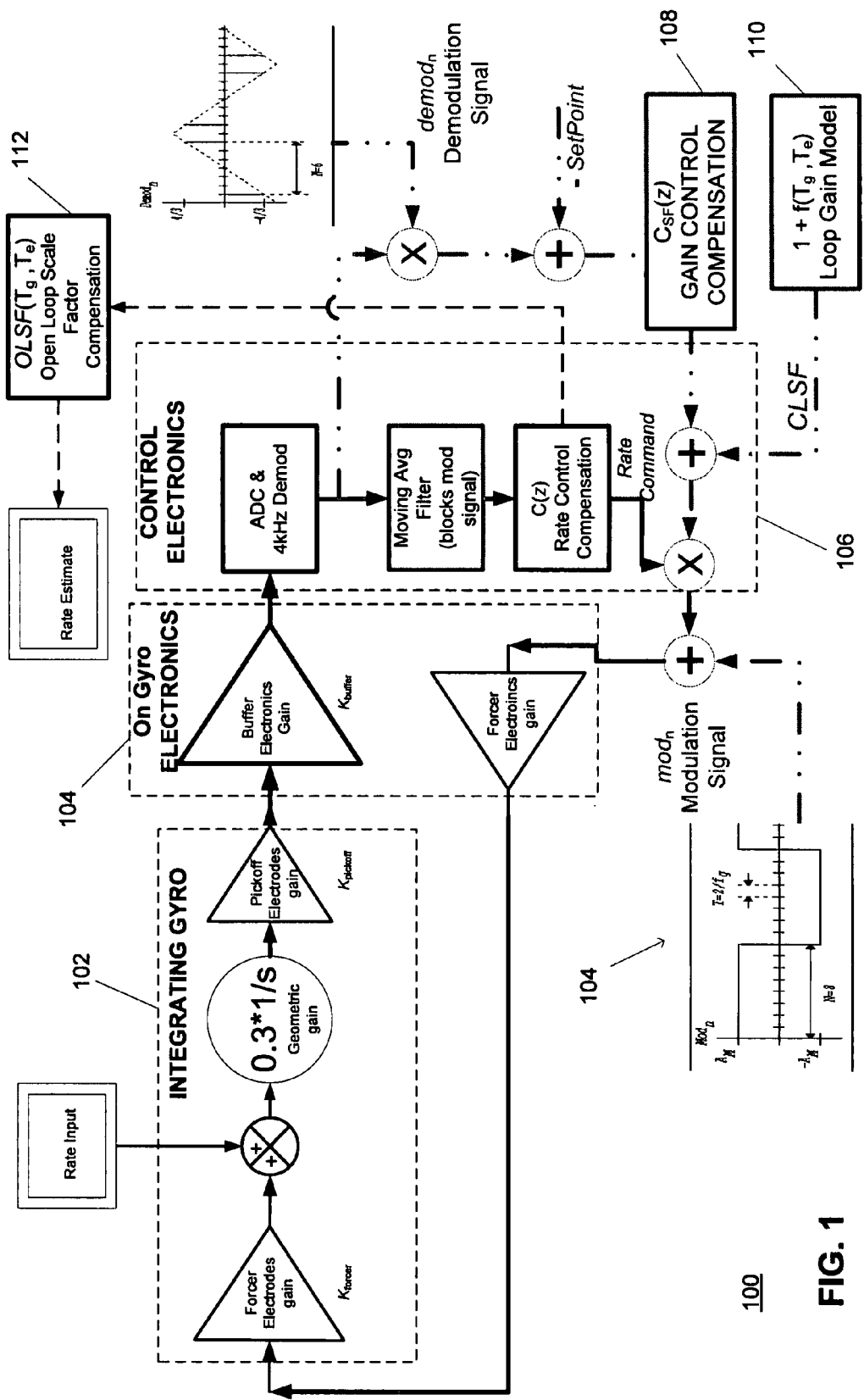
FIG. 1 is a representation of a prior art rate control loop processor utilizing square-wave CLSF modulation.

Turning to FIG. 1, one implementation of a prior art rate control loop processor 100 performs the closed loop scale factor method. The rate control loop processor 100 sums a 125 Hz rate square-wave modulation signal into the force to rebalance (FTR) loop command. Since the rate modulation frequency is above the bandwidth of the rate control loop, it causes the flex pattern of the gyros to rotate away from the normal FTR null position by an angle equivalent to the integral of the CLSF rate modulation. The position of the rotated flex pattern is determined from the nodal (ND) and antinodal (AN) pickoff signal ratio, for example, the arctangent of the ratio of the nodal voltage divided by the antinodal voltage. By comparing the measured flex angle to the integral of the rate modulation signal the error in the FTR SF can be estimated.

The drawbacks of the fixed 125 Hz square wave rate modulation signal may be overcome by the use of a random or pseudo-random modulation signal. This prevents the modulation signal from being correlated with either the flex frequency, internally generated frequencies, or rates input to the gyro. The use of a purely random modulation signal may cause new problems if there are extended periods of time where the sequence does not have a zero mean, if the sequence integrates to a value that saturates the high gain ND electronics, or if the sequence has extended periods with the same frequency content. These problems can be avoided by generating a "random" sequence in advance (e.g., pseudo-random) so that the sequence can be verified to be free from these issues. The pseudo-random sequence can then be stored for retrieval during operation of the gyro.

Figure 2:
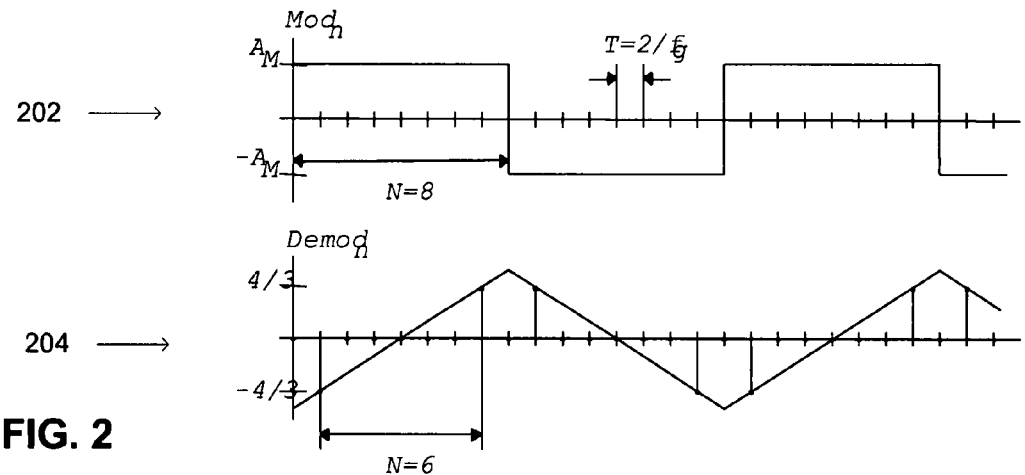
FIG. 2 is a representation of a square-wave rate modulation signal and the corresponding angle demodulation signal.
Figure 3:
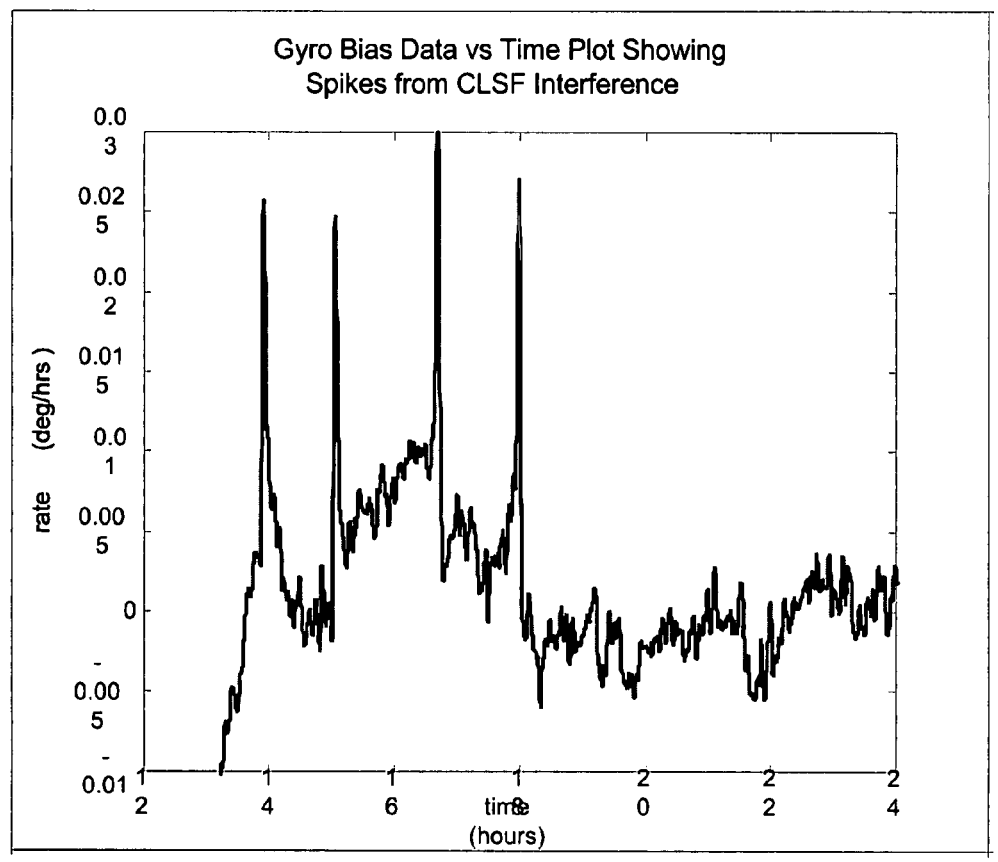
FIG. 3 is a representation of rate errors associated with the square-wave rate modulation signal of FIG. 2 and the rate control loop processor of FIG. 1.

Turning to FIGS. 2-3, a typical rate modulation signal comprises a square wave modulation signal 202. An angle demodulation signal 204 corresponds to an integral of the square wave modulation signal 202. When the apparatus 100 employs the signals 202 and 204 in operation, one example of rate errors that are corrupted by interactions with a 125 Hz square wave modulation signal.

Figure 4:
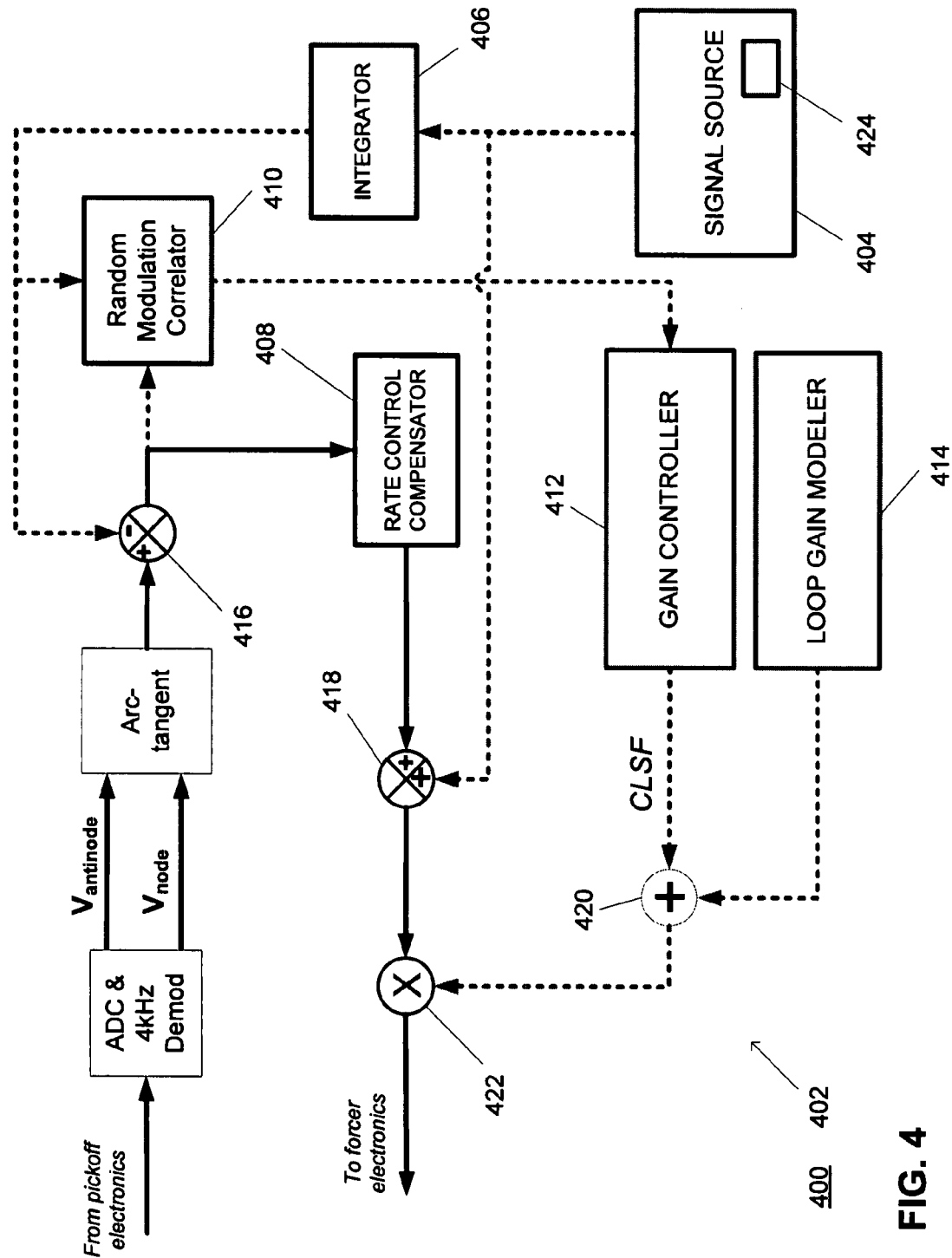
FIG. 4 is a representation of one implementation of an apparatus that comprises a random closed loop scale factor (CLSF) estimator.
Figure 5:
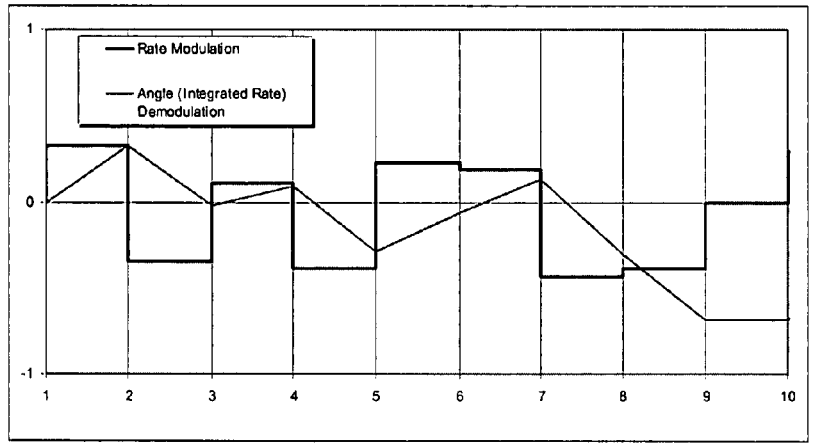
FIGS. 5-7 are representations of implementations of non-uniform rate modulation signals and the corresponding demodulation angle signals.
Figure 6:
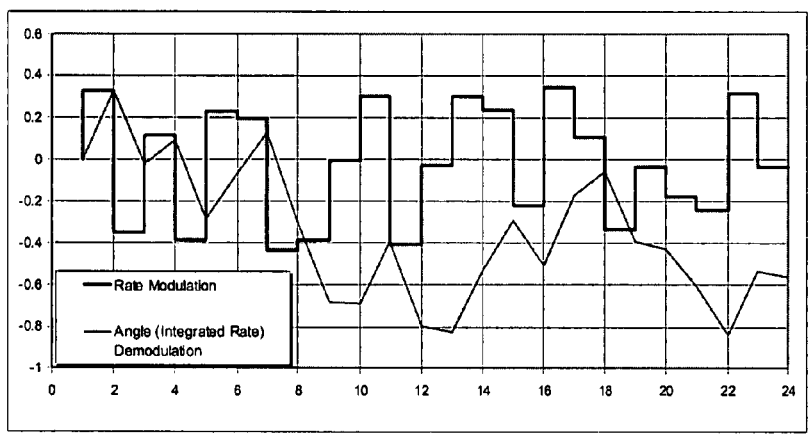
Figure 7:
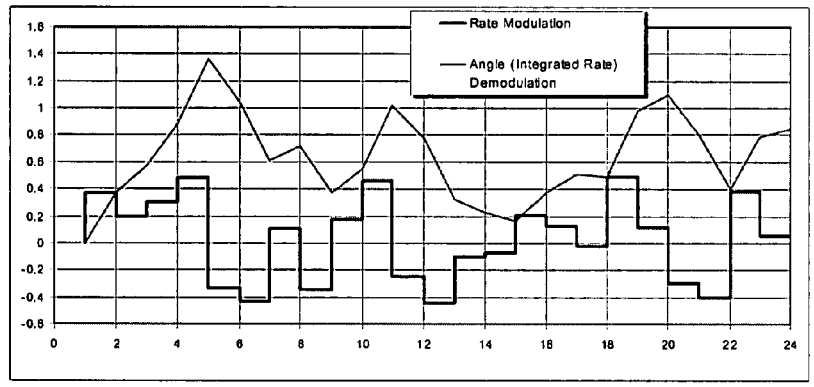
Figure 8:
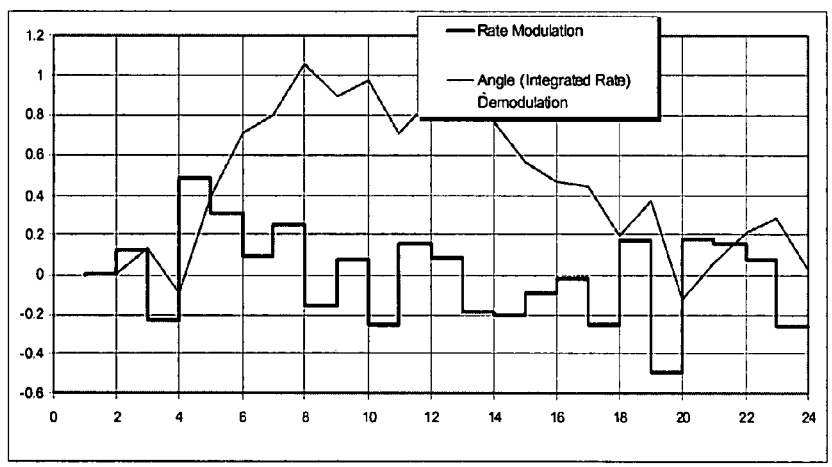
FIG. 8 is a representation of one implementation of a non-uniform rate signal and corresponding demodulation angle signal, illustrating a large excursion in angle.
Figure 9:
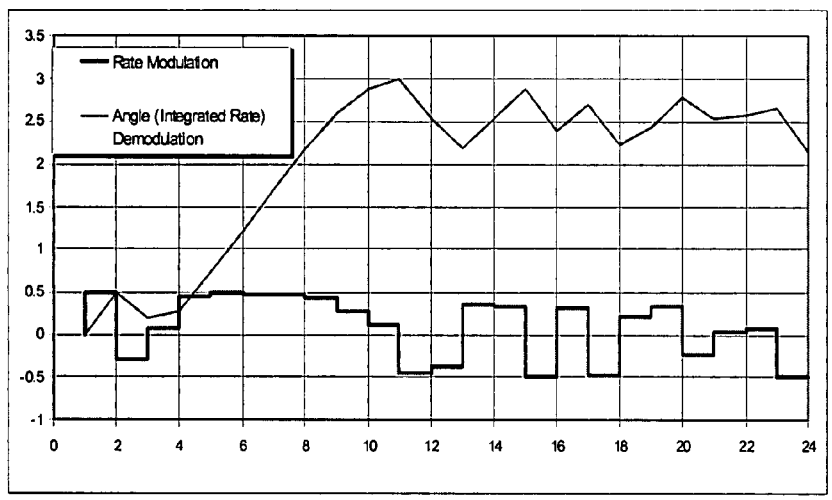
FIG. 9 is a representation of one implementation of a non-uniform rate signal and corresponding demodulation angle signal, illustrating repeated rate values.

Turning to FIG. 4, an apparatus 400 in one embodiment comprises a closed loop scale factor (CLSF) estimator configured to employ a random or pseudo-random modulation signal or sequence, for example, a random CLSF estimator 402. The random CLSF estimator 402 in one example is configured to estimate a force-to-rebalance (FTR) scale factor for a hemispherical resonator gyroscope (HRG). The HRG may be operated in either a force to rebalance (FTR) mode or a Whole Angle (WA) mode. The FTR mode is configured to constrain a resonant standing wave of the HRG by rebalancing the HRG with electrical force, as will be appreciated by those skilled in the art. The random CLSF estimator 402 is configured to employ a random or pseudo-random modulation signal or sequence, for example, in place of the 125 Hz modulation signal of the apparatus 100 of FIG. 1. The "random" modulation signal is decorrelated from environmental inputs, which allows for higher bandwidth operation.

The random CLSF estimator 402 in one implementation comprises a signal source 404, an integrator 406, a rate control compensator 408, a random modulation correlator 410, a random CLSF gain controller 412, a loop gain modeler 414, and mixers 416, 418, 420, and 422. The signal source 404 provides a modulation signal $\Omega_{r\text{-}mod}$ to the mixer 418. The modulation signal $\Omega_{r\text{-}mod}$ comprises a non-uniform rate signal. The mixer 418 combines the modulation signal $\Omega_{r\text{-}mod}$ with a force to rebalance (FTR) rate signal from the rate control compensator 408 to obtain a feedback rate signal. The mixer 422 mixes the feedback rate signal with a gain adjustment to obtain a forcer command signal and provides the forcer command signal to forcer electronics of the gyroscope.

After analog-to-digital conversion and demodulation, the flex angle $\Theta_{flex}$ is determined with an arctangent of the node voltage $V_{node}$ over the antinode voltage $V_{antinode}$. The integrator 406 provides an angle $\Theta_{r\text{-}mod}$, an integration of the modulation signal $\Omega_{r\text{-}mod}$, to the mixer 416. The mixer 416 subtracts the $\Theta_{r\text{-}mod}$ signal from the $\Theta_{flex}$ signal and passes a difference angle signal $\delta\Theta$ to the rate control compensator 408. The rate control compensator 408 determines the FTR feedback command from the difference angle signal $\delta\Theta$.

The gain adjustment for the mixer 422 is determined by the mixer 420 from the summation of a closed loop scale factor and an open loop gain correction signal. The random CLSF gain controller 412 provides the closed loop scale factor correction and the loop gain modeler 414 provides the open loop gain correction signal. The random CLSF gain controller 412 determines the closed loop scale factor (CLSF) correction based on a correlation estimate of the difference angle signal $\delta\Theta$ and the angle $\Theta_{mod}$ from the random modulation correlator 410. The random CLSF gain controller 412 may use additional parameters to determine the closed loop scale factor, for example, process and measurement noise parameters. The random CLSF gain controller 412 in one example dynamically adjusts the process and measurement noise parameters based on the stability of the gyroscope and the noise on the gyroscope measurements. If an event occurs which causes a shift in the scale factor level or stability, the random CLSF gain controller 412 may open up the filter gains to allow faster recovery. In another example, the random CLSF gain controller 412 may clamp down the process gains when the gyroscope is operating in a stable environment. This will allow the scale factor estimates to improve to a level where the estimate stability approaches the stability of the sensor physics, which has been shown to be below 1 ppm. The estimation of the FTR scale factor correction from the demodulated rate data may be implemented in various fashions. One implementation comprises a Kalman filter that estimates the SF correction through its correlation to the integrated random rate modulation signal.

The signal source 404 is configured to provide the non-uniform rate signal with one or more desired characteristics. In one example, signal source 404 provides a pseudo-random signal as the non-uniform rate signal, which serves to reduce correlation of an inertial rate input with the non-uniform rate signal. Reduced correlation allows for higher response bandwidth of the HRG signal. The non-uniform rate signal in one example is pre-generated by the signal source 404. In another example, the signal from the signal source 404 is rejected as unusable when the non-uniform rate signal is shorter than a predetermined duration, for example, 10 seconds. In one example, the signal source 404 also provides the modulation angle signal to the random modulation correlator 410 and the mixer 416, which allows removal of the integrator 406. The signal source 404 in one example stores the non-uniform rate signal and/or the modulation angle signal in a lookup table. In a further example, the signal source 404 stores the non-uniform rate signal and/or the modulation angle signal in a memory unit, such as the recordable data storage medium 424, as will be appreciated by those skilled in the art.

The non-uniform rate signal from the signal source 404 in one example is evaluated before storage to ensure that the signal is in compliance with one or more constraints. A first constraint is that the non-uniform rate signal has a mean of zero. This ensures that a value of the integral of the non-uniform rate signal is zero over the predetermined repetition period and serves to prevent a bias error from being added to the rate control compensator 408. Although a long-term evaluation of the non-uniform rate signal may appear "random", a truncated sequence of the non-uniform rate signal may contain frequency content that could interfere with performance of the HRG. Accordingly, a second constraint is that the non-uniform rate signal does not contain dominant frequency content. A third constraint is that the non-uniform rate signal does not contain values that are more than a predetermined number, in one example the constraint is no repeated values for more than three successive steps. A fourth constraint is that a maximum excursion of the integral of the non-uniform rate signal stays within a voltage range of a high gain nodal signal from the HRG. For example, a signal-to-noise ratio of an analog to digital converter is improved using an analog high gain stage for a null point of a servo. The non-uniform rate signal will cause the effective nulling point of the rate control compensator 408 to move in a "random walk" fashion. The maximum of this "walking" should be well within the voltage range of the signal analog electronics and the analog to digital converter, as will be appreciated by those skilled in the art.

Another example of an application where the random CLSF estimator 402 would be valuable is a strategic navigation system which has to continue to operate with high performance after an exposure to a radiation environment. An uncorrected scale factor in this situation would take a very large step due to degradation of a voltage reference and/or amplifier gains. Since the time of degradation due to the radiation environment is accurately known, the Kalman filter of the random CLSF estimator 402 can be opened up to quickly converge to the new value, then refined throughout the rest of the mission as it tightens the Kalman gains. Although the time to converge on the scale factor to the required precision may be longer than desired, a system processor for the random CLSF estimator 402 should be able to correct the prior uncorrected scale factor induced errors once the estimate converges, as will be appreciated by those skilled in the art.

In another application, the random CLSF estimator 402 can be used in a pre-flight mode to provide even higher accuracy estimates since at that time, the vehicle is known to have little or no net motion. This could allow the random CLSF estimator 402 to provide greatly improved scale factor compensation parameters even if mission considerations prohibit its use in-flight. Since the random CLSF estimator 402 provides a scale factor self-calibration, a fully self-calibrating gyroscope could be built by the addition of a bias self calibration technique. One example of a bias self calibration technique is disclosed in U.S. patent application Ser. No. 11/057,324, the disclosure of which is incorporated herein by reference.

Turning to FIGS. 5-9, various examples of non-uniform rate signals and corresponding demodulation angle signals are shown as plots 502, 602, 702, 802, and 902. Plots 502, 602, and 702 show examples of desirable plots for the random CLSF estimator 402 with bounded angles and few repeated values. Plot 802 shows one example of a large excursion in the angle and may be less desirable. Plot 902 shows one example of a series of repeated values in the non-uniform rate signal which may also be less desirable.

The apparatus 400 in one example comprises a plurality of components such as one or more of electronic components, hardware components, and computer software components. A number of such components can be combined or divided in the apparatus 400. An example component of the apparatus 400 employs and/or comprises a set and/or series of computer instructions written in or implemented with any of a number of programming languages, as will be appreciated by those skilled in the art.

The apparatus 400 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 400 comprise the recordable data storage medium 424 of the signal source 404. The computer-readable signal-bearing medium for the apparatus 400 in one example comprise one or more of a magnetic, electrical, optical, biological, and atomic data storage medium. For example, the computer-readable signal-bearing mediums comprise floppy disks, magnetic tapes, CD-ROMs, DVD-ROMs, hard disk drives, random access electronic memory (RAM) or read-only electronic memory (ROM).

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a closed loop scale factor (CLSF) estimator configured to compare a measured flex angle of a hemispherical resonator gyroscope (HRG) with a demodulation angle signal to estimate a force-to-rebalance (FTR) closed loop scale factor for the HRG, wherein the demodulation angle signal corresponds to an integral of a non-uniform rate signal applied to the HRG.

2. The apparatus of claim 1, further comprising:
a signal source that is configured to provide the non-uniform rate signal to the CLSF estimator.

3. The apparatus of claim 2, wherein the signal source is configured to provide a pseudo-random signal as the non-uniform rate signal to the CLSF estimator.

4. The apparatus of claim 2, wherein the signal source is configured to provide a pre-generated signal as the non-uniform rate signal to the CLSF estimator.

5. The apparatus of claim 4, wherein the signal source is configured to repeat the non-uniform rate signal, wherein the non-uniform rate signal has a predetermined duration.

6. The apparatus of claim 5, wherein the predetermined duration is at least 10 seconds.

7. The apparatus of claim 5, wherein the signal source is configured to provide the pre-generated signal such that a value of the integral of the pre-generated signal over the predetermined duration is equal to zero.

8. The apparatus of claim 4, wherein the signal source is configured to provide the pre-generated signal without a dominant frequency within the pre-generated signal.

9. The apparatus of claim 4, wherein the signal source is configured to provide the pre-generated signal without rate steps repeated for longer than a predetermined duration.

10. The apparatus of claim 4, wherein the signal source is configured to provide the pre-generated signal such that a maximum value of the integral of the pre-generated signal is within a voltage range of a high gain nodal signal from the HRG.

11. The apparatus of claim 1, wherein the CLSF estimator comprises a Kalman filter for estimation of the FTR closed loop scale factor for the HRG.

12. The apparatus of claim 2, wherein the signal source comprises a computer readable signal-bearing medium configured to store the non-uniform rate signal.

13. A method for closed loop scale factor estimation, comprising the steps of:
providing a non-uniform rate signal to a closed loop scale factor (CLSF) estimator;
applying the non-uniform rate signal to a hemispherical resonator gyroscope (HRG);
estimating a force-to-rebalance (FTR) closed loop scale factor based on a comparison of a measured flex angle of the HRG with a demodulation angle signal, wherein the demodulation angle signal corresponds to an integral of the non-uniform rate signal.

14. The method of claim 13, wherein the step of providing the non-uniform rate signal comprises the step of;
providing a pseudo-random signal as the non-uniform rate signal.

15. The method of claim 13, wherein the step of providing the non-uniform rate signal comprises the step of:
providing a pre-generated signal as the non-uniform rate signal.

16. The method of claim 15, wherein the step of providing the pre-generated signal as the non-uniform rate signal comprises the step of:
providing the pre-generated signal repeatedly over a repetition period.

17. The method of claim 15, wherein the step of providing the pre-generated signal as the non-uniform rate signal comprises the step of:
selecting the pre-generated signal such that a value of the demodulation angle signal over the predetermined duration is equal to zero.

18. The method of claim 15, wherein the step of providing the pre-generated signal as the non-uniform rate signal comprises the step of:
selecting the pre-generated signal such that the pre-generated signal does not comprise a dominant frequency.

19. The method of claim 15, wherein the step of providing the pre-generated signal as the non-uniform rate signal comprises the step of:
selecting the pre-generated signal such that the pro-generated signal does not comprise rate steps that are repeated for longer than a predetermined duration.

20. The method of claim 15, wherein the step of providing the pre-generated signal as the non-uniform rate signal comprises the step of:
selecting the pre-generated signal such that a maximum value of the demodulation angle signal is within a voltage range of a high gain nodal signal from the HRG.

21. The method of claim 13, wherein the step of applying the non-uniform rate signal to the HRG comprises the step of:
summing the non-uniform rate signal with a force to rebalance (FTR) rate signal from a rate control compensator to obtain a feedback rate signal;
mixing the feedback rate signal with a gain signal to obtain a forcer command signal, wherein the gain signal comprises a summation of the closed loop scale factor and an open loop gain correction signal;
providing the forcer command signal to forcer electronics of the HRG;
wherein the step of estimating the FTR closed loop scale factor based on the comparison of the measured flex angle of the HRG with the demodulation angle signal comprises the step of:
subtracting the demodulation angle signal from the measured flex angle to obtain a difference angle signal;
correlating the difference angle signal with the demodulation angle signal to estimate the closed loop scale factor.

22. An apparatus, comprising:
a hemispherical resonator gyroscope (HRG);
a rate control compensator configured to estimate a force-to-rebalance (FTR) rate signal for the HRG;
a signal source configured to provide a non-uniform rate signal; and
a random CLSF gain controller configured to estimate a closed loop scale factor for the HRG based on a comparison of an integral of the non-uniform rate signal with a measured flex angle of the HRG.

23. The apparatus of claim 22, wherein the signal source is configured to provide a pseudo-random signal as the non-uniform rate signal;
wherein the signal source is configured to ensure that the pseudo-random signal comprises a zero mean, no dominant frequency content, and no sequential rate steps of the same value for longer than a predetermined length.

24. The apparatus of claim 22, wherein the signal source is configured to provide a pre-generated signal as the non-uniform rate signal;
wherein, the signal source comprises a computer-readable signal-bearing media that stores the pre-generated signal.

25. The apparatus of claim 22, wherein the random CLSF gain controller comprises a Kalman filter configured to estimate the closed loop scale factor through correlation of the measured flex angle and the integral of the non-uniform rate signal.

* * * * *